(12) United States Patent
Chen

(10) Patent No.: US 12,288,180 B2
(45) Date of Patent: Apr. 29, 2025

(54) AUTOMATED CARGO SELECTION FOR TRANSPORT SYSTEM

(71) Applicant: SAP SE, Walldorf (DE)

(72) Inventor: Yan Chen, Cupertino, CA (US)

(73) Assignee: SAP SE, Walldorf (DE)

( * ) Notice: Subject to any disclaimer, the term of this patent is extended or adjusted under 35 U.S.C. 154(b) by 726 days.

(21) Appl. No.: 17/549,721

(22) Filed: Dec. 13, 2021

(65) Prior Publication Data

US 2023/0206162 A1   Jun. 29, 2023

(51) Int. Cl.
```
G06Q 10/083      (2024.01)
G06Q 10/0631     (2023.01)
G06Q 10/0835     (2023.01)
G06Q 20/20       (2012.01)
```

(52) U.S. Cl.
CPC ..... *G06Q 10/083* (2013.01); *G06Q 10/06312* (2013.01); *G06Q 10/06315* (2013.01); *G06Q 10/08355* (2013.01); *G06Q 20/203* (2013.01)

(58) Field of Classification Search
CPC .............. G06Q 20/203; G06Q 10/083; G06Q 10/06312; G06Q 10/06315; G06Q 10/08355
USPC .................................................. 700/214, 216
See application file for complete search history.

(56) References Cited

U.S. PATENT DOCUMENTS

| | | | | |
|---|---|---|---|---|
| 10,787,315 B2* | 9/2020 | Hance | ................... | G06Q 10/083 |
| 10,970,668 B2* | 4/2021 | Han | ....................... | G08G 1/202 |
| 11,144,871 B2* | 10/2021 | Yao | ................... | G06Q 10/08355 |
| 2004/0039597 A1* | 2/2004 | Barts | .................. | G06Q 10/0834 705/13 |
| 2004/0128177 A1* | 7/2004 | Wei | .................. | G06Q 10/06315 700/99 |
| 2009/0254405 A1* | 10/2009 | Hollis | .............. | G06Q 10/06315 705/7.25 |
| 2014/0019471 A1* | 1/2014 | Linton | ................. | G05B 19/418 707/759 |
| 2017/0178070 A1* | 6/2017 | Wang | ............. | G06Q 10/063116 |
| 2018/0182054 A1* | 6/2018 | Yao | ................ | G06Q 10/063112 |
| 2022/0180281 A1* | 6/2022 | Walton | ........... | G06Q 10/063114 |
| 2023/0169426 A1* | 6/2023 | Morgan | ............ | G06Q 30/0202 705/7.22 |

\* cited by examiner

*Primary Examiner* — Jacob S. Scott
*Assistant Examiner* — Michael E Butler
(74) *Attorney, Agent, or Firm* — Fountainhead Law Group, PC

(57) ABSTRACT

Techniques for automated cargo selection in a transport system are provided. In some embodiments, a method comprises: receiving a list of materials to be received by a depot from a plurality of sources within a predetermined period of time; receiving a specification of materials to be received by a facility from the depot within the predetermined period of time; and generating a cargo plan based on the list and the specification, the cargo plan indicating quantities of each material of a plurality of materials to be loaded onto a transport within the predetermined period of time. The method may further comprise: moving a first material of the plurality of materials from a vehicle to the transport based on the cargo plan during the predetermined period of time; and initiating launch of the transport.

20 Claims, 6 Drawing Sheets

AUTOMATED CARGO SELECTION FOR TRANSPORT SYSTEM

BACKGROUND

In some production models, materials may be processed by a facility to optimally meet demand and utilize equipment. These goals may be met by acquiring materials from a supplier in a mix needed by the facility for its production process. This can reduce inventory costs and wastage, and increase facility productivity and profit. The supplier may deliver materials to the facility.

DETAILED DESCRIPTION

Figure 1:
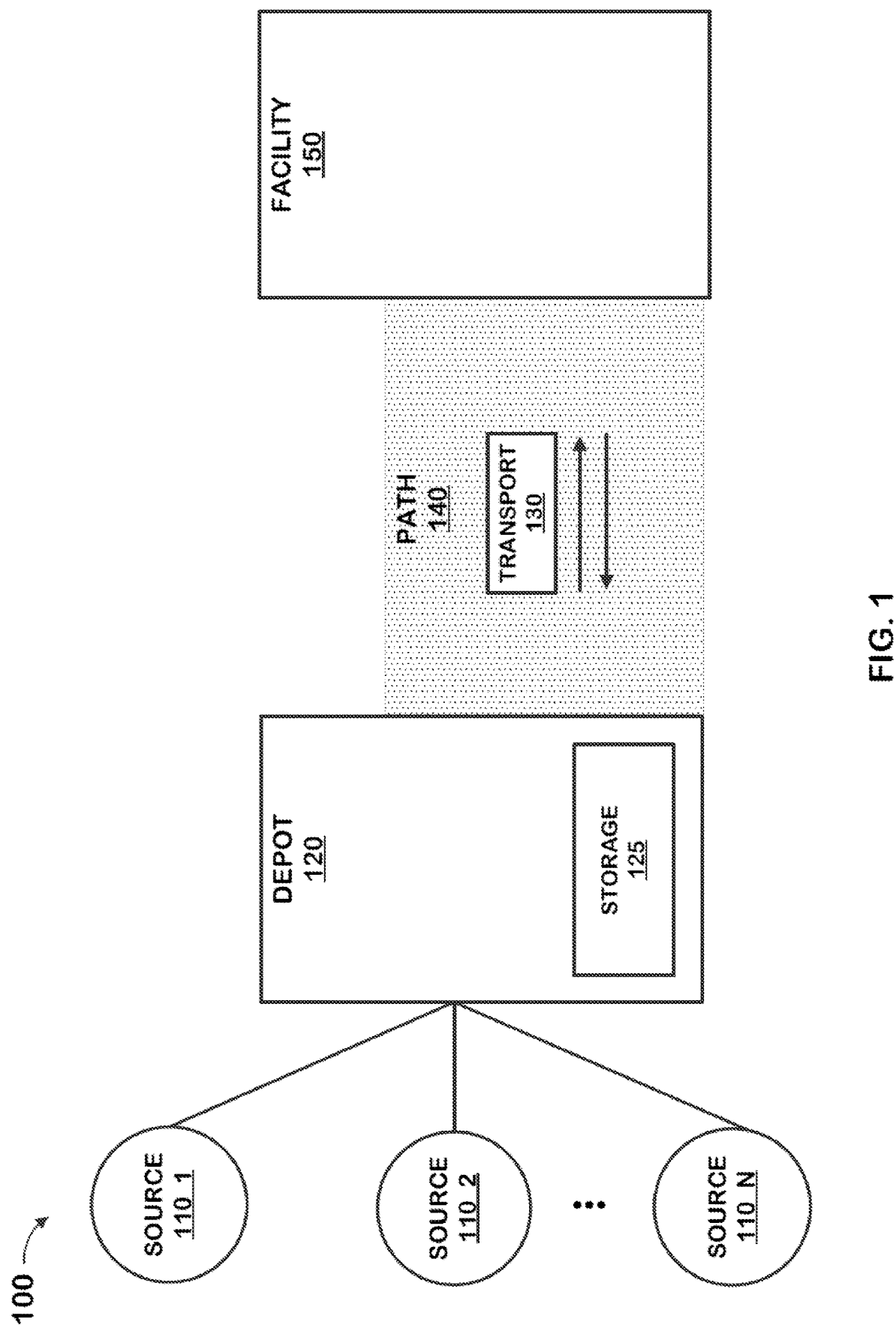
FIG. 1 illustrates a transport system according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Overview

Described herein are techniques for automatically selecting cargo to be loaded onto a transport. A facility, such as a factory or mill, may receive materials as inputs. To minimize inventory and/or optimize utilization of the equipment/machinery at the facility, the facility may request a certain mix of these materials within a predetermined time frame from a supplier. For the purposes of illustration, the supplier may ship materials from a depot to the facility using a transport system. The supplier may receive materials from multiple sources at the depot. The materials may be stored at the depot or loaded onto the transport as they are received. The transport may carry the materials from the depot to the facility. Materials loaded onto the transport may be referred to as cargo.

The facility may specify the materials it needs for a certain time period, such as an hour, day, week, month, quarter, and the like. The depot may receive information about materials that it will get from its sources within the time period, including characteristics of the materials and when the vehicles carrying them will arrive at the depot. The depot may also receive or generate a schedule for the transport (e.g., when the transport will be at the depot for loading) based on an average transit time for the transport between the depot and the facility, weather forecast, traffic forecast, and the like. Using the above information, an optimal mix of materials to be loaded onto the transport may be determined.

The techniques described in the present application provide a number of benefits and advantages over conventional methods for selecting cargo for loading onto a transport. Typically, a human, such as a foreman, scheduler/planner, manager, supervisor, and the like at the depot may select cargo based on intuition and an estimation of what the facility needs, what the depot has on hand, and what will arrive at the depot. However, it is impractical for a human to mentally juggle the numerous variables and calculate what to load onto the transport and adjust for changing conditions in real time. A suboptimal mix of materials can end up being shipped to the facility. Accordingly, the only data available for training a machine learning model would be suboptimal results from human choices. A model trained in this way would also produce suboptimal selections. A suboptimal mix may increase inventory costs and wastage, and decrease facility productivity and profit.

Transport System

FIG. 1 illustrates a simplified transport system 100 for selecting cargo according to some embodiments. As shown, transport system 100 includes sources 110_1-110_N, depot 120, transport 130, and facility 150. Sources 110_1-110_N provide materials or goods that will be used by facility 150. For example, sources 110_1-110_N may be forests (or sections of a large forest) from which wood of different types is harvested, mines from which metals and/or minerals are extracted, a sub-depot (e.g., unenclosed storage area, shed, warehouse, etc.) where materials may be stored, a factory which produces subcomponents, and the like.

Depot 120 may receive materials from source 110_1-110_N using vehicles (not shown in FIG. 1). For example, vehicles may be various combinations of trucks, trains, airplanes, boats, and the like. Depot 120 may include a storage area 125. Storage area 125 may be an unenclosed storage area, warehouse, and the like. Depot 120 may also include a loading dock and/unloading dock (not shown in FIG. 1). When a vehicle arrives at depot 120, the material(s) that it carries may be taken from the vehicle at the unloading dock and loaded onto transport 130 at the loading dock and/or placed in storage 125.

Once transport 130 is loaded, transport 130 may transit over path 140 to facility 150. Path 140 may be one route or multiple routes selected based on conditions such as weather, traffic, and the like. By way of non-limiting example, transport 130 may be a barge and path 140 may be a river. Other vehicles and paths may be used. For example, transport 130 may be combinations of cargo ships, freight trucks, tanker trucks, pipelines, cargo planes, drones, and the like. Path 140 may be combinations of roads, rivers, bodies of water, airspace, and the like. Although one transport 130 is depicted in FIG. 1, transport 130 may be more than one vehicle transiting between depot 120 and facility 150.

Facility 150 may receive material(s) from transport 130 at an unloading dock (not shown in FIG. 1). The material(s) may then be processed by facility 150. By way of non-limiting example, facility 150 may be a sawmill where logs are cut into lumber (e.g., planks and boards). Facility 150 may be other types of plants. For example, facility 150 may be an orange juice factory, oil refinery, steel mill, aluminum smelter, and the like.

Information Flows

A computing system (not shown in FIG. 1)—such as will be described with reference to FIGS. 5 and 6—may, for example, may be at depot 120 or in the cloud. The computing system may receive a list of materials being sent from each of sources 110_1-110_N to depot 120. The list may include an identifier of the source (of sources 110_1-110_N), amount (e.g., quantity, volume, etc.) of the material(s), a type (e.g., species) of the material(s), and characteristics of the material(s) (e.g., total phenolic content, amount of calcium, moisture, and the like). In addition, progress information for each vehicle carrying the material(s) from sources 110_1-110_N to depot 120 (e.g., velocity, location, weather and/or traffic conditions, and the like) may be received at regular intervals (e.g., once per second, minute, hour, day, etc.) using wireless and/or wired communications.

Depot 120 may have data concerning an inventory of material(s) in storage 125 and provide it to the computing system. The inventory may be similar to the list of materials sent from sources 110_1-110_N, but for the material(s) in storage 125. Transport 130 may send, similar to the vehicles carrying material(s) from material(s) from sources 110_1-110_N to depot 120, progress information at regular intervals to the computing system using wireless communications.

Facility 150 may provide to the computing system a specification of the materials needed on transport 130 (e.g., from sources 110_1-110_N and depot 120). In other words, the specification may list the names, sources, and characteristics of materials needed by the facility for a particular period/amount of time, such as an hour, day, week, month, quarter, and the like. The specification may include a percentage of each material from sources 110_1-110_N and other characteristics, such as minimum and/or maximum values for total phenolic content, amount of calcium, moisture, and the like.

Simplified Workflow for Automated Cargo Selection

Figure 2:
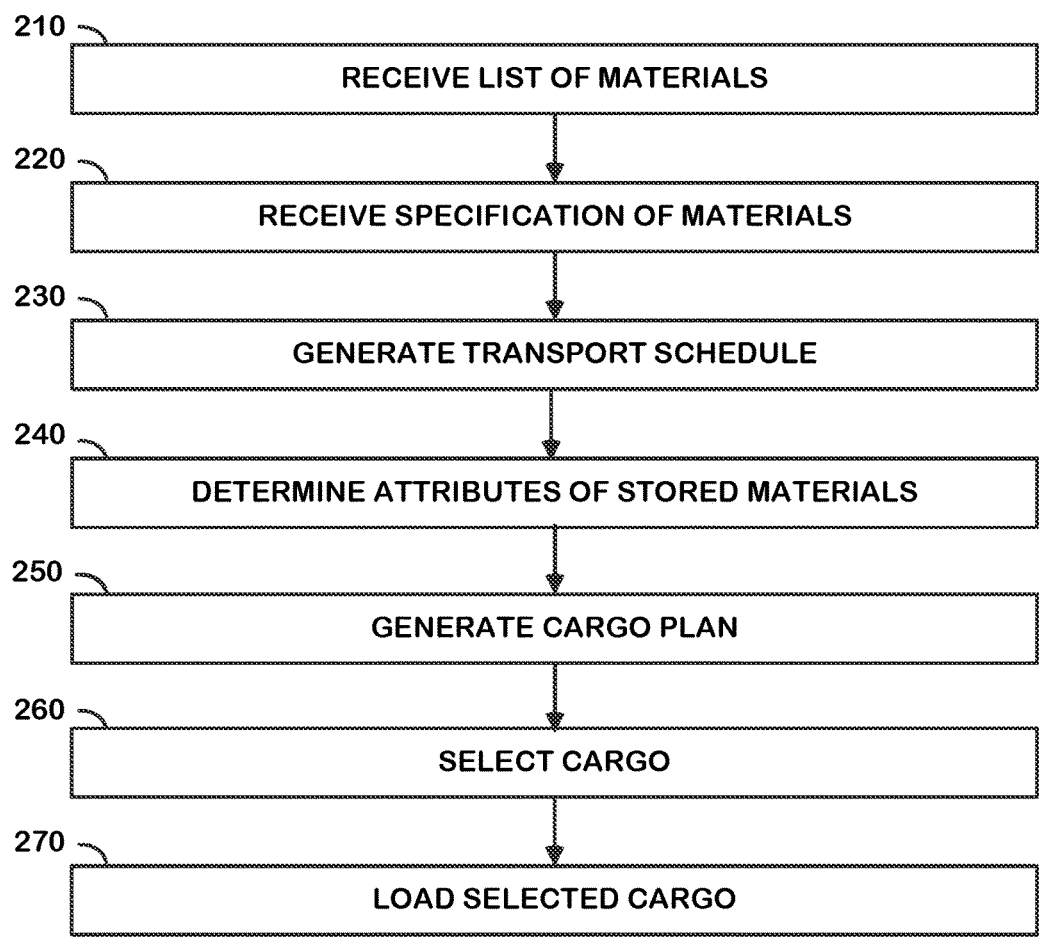
FIG. 2 illustrates a process for automatically selecting cargo according to various embodiment.

FIG. 2 illustrates process (or method) 200 for automatically selecting cargo for transport according to various embodiments. In some embodiments, a computing system such as shown in FIGS. 5 and 6 may perform process 200. The computing system may be at combinations of depot 120, in the cloud, and the like. Process 200 is described with reference to FIG. 1. Process 200 may commence at 210, where the computing system may receive a list of materials from each of sources 110_1-110_N. The list of materials may be valid for or applicable to a particular period/amount of time. The list of materials may include when the vehicle transporting the material(s) (from each of sources 110_1-110_N) will arrive at depot 120. The vehicle transporting the materials(s) may periodically provide progress information to the computing system so that the computing system may update the vehicle's arrival time at depot 120.

At 220, the computing system may receive from facility 150, a specification of the materials the facility needs during the particular period/amount of time, as described above. At 230, the computing system may generate a schedule for the transport based on past schedules, average transit time by transport 130 between depot 120 and facility 150, current weather, weather forecast, traffic conditions, and the like. Alternately or additionally, the computing system may receive the schedule from facility 150. Transport 130 may periodically provide progress information to the computing system and/or facility 150, which may then update the arrival time of transport 130 at depot 120.

At 240, the computing system may retrieve or determine an amount, type, and attributes/characteristics of material stored in storage 125. The material stored in storage 125 may be left over from an earlier/preceding time period.

At 250, the computing system may generate a cargo plan. The cargo plan may be based on the list received at 210, the specification received at 220, the schedule generated at 230, and the leftover material determined at 240. The cargo plan may specify the percentage of each material from each of sources 110_1-110_N that will be loaded onto transport 130 during the particular period/amount of time.

At 260, the computing system may select cargo from material stored in storage 125 and aboard a vehicle transporting the material(s) (from each of sources 110_1-110_N). When a vehicle transporting the material(s) (from each of sources 110_1-110_N) arrives at depot 120, it may be unloaded onto transport 130, in accordance with the cargo plan. For example, when the vehicle carries a material(s) included in the cargo plan and the percentage/amount specified in the cargo plan is not already met, the material may be loaded from the vehicle to transport 130. When a vehicle is not at depot 120, a vehicle is at depot 120 but is not carrying a material(s) specified in the cargo plan, or when the material carried by the vehicle is no longer needed by the cargo plan, a material(s) in storage 125 may be loaded onto transport 130, in accordance with the cargo plan. That is, when storage 125 has a material(s) included in the cargo plan and the percentage/amount specified in the cargo plan is not already met, the material may be loaded from storage 125 to transport 130.

At 270, the cargo selected at 260 may be loaded onto transport 130. At 270, the computing system may optionally initiate launch of transport 130. When transport 130 is an autonomous vehicle, the computing system may send an indication to a control system of transport 130 to begin moving transport 130 to deliver the cargo to facility 150. When transport 130 is a manned vehicle, the computing system may send an indication to an operator (e.g., captain, driver, and the like) of transport 130 to begin moving transport 130 to deliver the cargo to facility 150.

Transport System Detailed Example

Figure 3:
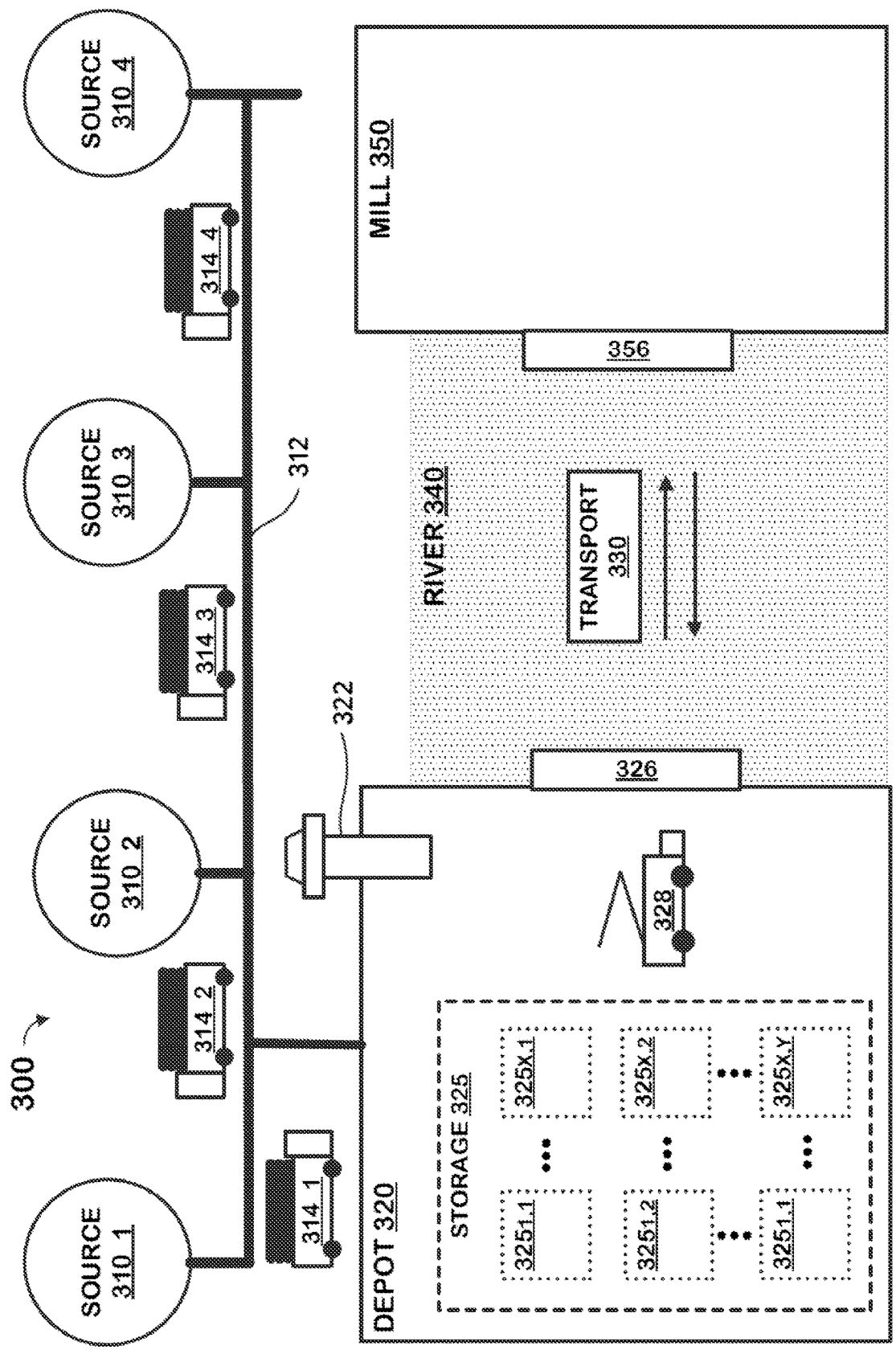
FIG. 3 illustrates additional details of the transport system of FIG. 1 in accordance with some embodiments.

FIG. 3 shows transport system 300, which illustrates further details of transport system 100 in FIG. 1, in accordance with some embodiments. The details are provided purely for illustrative purposes and not limitation. Transport system 300 may have at least some of the characteristics of transport system 100 described above.

As shown, transport system 300 may include sources 310_1-310_4, roads 312, vehicles 314_1-314_4, depot 320, transport 330, river 340, and mill 350. Source 310_1 may be a forest or a section of a forest with *Eucalyptus grandis* trees (*Grandis*); source 310_2 with *Eucalyptus dunni* trees (Dunni), source 310_3 with a sub-depot or temporary depot storing wood from one or more of the sources; and source 310_4 with *Eucalyptus globulus* trees (*Globulus*). Harvested trees from sources 310_1-310-4 may be referred to as logs or wood. Vehicle 314_1 may bring *Grandis* from source 310_1 to depot 320; vehicle 314_2 Dunni; and vehicle 314_4 *Globulus*. Vehicles 314_1-314_4 may be trucks for carrying the logs. Although one vehicle is shown to carry and deliver each species, more than one vehicle may carry and deliver each species to depot 320. Roads 312 may be combinations of unpaved trails in the forest, streets, freeways, highways, and the like.

Depot 320 may include control tower 322, storage 325, loading dock 326, and one or more cranes 328. Control tower 322 may be a building where depot 320 may be managed by human operators and/or a computing system. For example, a computing system which performs methods 200 and 400 (FIGS. 2 and 4) and/or a client which communicates with a cloud computing system may be in control tower 322. Unloading logs from vehicles 314_1-314_4 and loading logs onto transport 330 may be orchestrated from control tower 322 by at least one of a computing system and human operator.

In some embodiments, the computing system and/or human operator in control tower 322 may know when one of vehicles 314_1-314_4 has arrived at depot 320 (and its approximate location in depot 320) based on radio frequency transmissions (e.g., from a transponder, wireless network (e.g., Wi-Fi, 4G, 5G, and the like) adapter, etc.), and the like from the one of vehicles 314_1-314_4. Alternatively or additionally, the computing system and/or human operator in control tower 322 may visually recognize the one of vehicles 314_1-314_4 has arrived and its location in depot 320 using eyes and/or a camera (and computer vision), via human or computer-generated communications with a driver of the one of vehicles 314_1-314_4, and the like. Similarly, the computing system and/or human operator in control tower 322 may know when transport 330 is at loading dock 326 based on radio frequency transmissions from transport 330.

Storage 325 is a space in depot 320 in which logs brought to depot 320 by vehicles 314_1-314_4 may be stored in depot 320 if not loaded onto transport 330. Storage 325 may be an uncovered or covered space (e.g., warehouse). Although represented as a matrix of plots $325_{1,1}$-$325_{X,Y}$ of roughly equal size, storage 325 may be an irregular shape and have plots of unequal size. For example, storage 325 may be stacks of logs in plots $325_{1,1}$-$325_{X,Y}$ of varying sizes. Plots $325_{1,1}$-$325_{X,Y}$ may be arranged such that one or more cranes can access plots $325_{1,1}$-$325_{X,Y}$ for unloading and loading. Loading dock 326 and/or unloading dock 356 may be a structure extending alongshore or out from the shore into river 340. Transport 330 may tie up at loading dock 326 in order to load logs from vehicles 314_1-314_4 and/or storage 325 onto transport 330.

One or more cranes 328 may unload logs from vehicles 314_1-314_4 onto transport 330 and/or storage 325; and load logs from storage 325 onto transport 330. One or more cranes 328 may be machines, generally equipped with rope, wire rope, chains, or sheaves, to raise/lower logs for loading and unloading. In some embodiments, one or more cranes 328 may robotic (e.g., not needing human operators, automated) and may be controlled by a computing system in control tower 322, according to the cargo plan. Loading logs onto transport 330 may be automated in this way. One or more cranes 328 may be additionally or alternatively be combinations of robotic and human operated. One or more cranes 328 may be additionally or alternatively be combinations controlled by a by a computing system and human supervisor(s) in control tower 322. Although mobile cranes are depicted, combinations of fixed and mobile cranes may be used.

Transport 330 may be barge (flat-bottomed boat) or other watercraft for carrying freight (wood, logs, etc.). Although one transport is depicted, transport 330 may be more than one transport. River 340 may be a large natural stream of water flowing in a channel. Transport 330 may tie up at unloading dock 356 in order to unload logs for mill 350. Mill 350 may be a facility where logs are cut into lumber, such as beams and planks. Equipment in mill 350 may include motorized saws.

The example of FIG. 3 is provided by way of example and not limitation. Other materials, such as oranges, crude oil, iron, and aluminum may be used. For example, vehicles 314_1-314_4 and transport 330 may be combinations of trains, cargo planes, drones, cargo ships, taker trucks, pipelines, and the like. By way of further non-limiting example, mill 350 may be an orange juice factory, oil refinery, steel mill, aluminum smelter, and the like. Moreover, combinations of sources 310_1-310_4, vehicles 314_1-314_4, depot 320, transport 330, and mill 350 may be from combinations of the same business organization, different suborganizations (e.g., subsidiaries) of the same organization, and different organizations. For example, sources 310_1-310_4 and depot 320 may be in the same company, vehicles 314_1-314_4 may be contractors for depot 32, depot 320 and mill 350 may be in different companies (e.g., in a customer-supplier relationship), and the like.

Constituents of transport system 300 may include combinations of measuring devices, sensing devices (sensors), Internet of things (IoT) devices, and the like. In addition, these devices may communicate over wired (e.g., local area network, wide area network, and the like) and/or wireless communications (e.g., Wi-Fi, 4G, 5G, satellite, and the like). Alternatively or additionally, client devices—described in FIGS. 5 and 6—may be constituents of transport system 300. For example, the computing system(s) which performs methods 200 and 400 of FIGS. 2 and 4 (respectively) may receive information from combinations of vehicles 314_1-314_4, sources 310_1-310_4, storage 325, loading dock 326, transport 330, unloading dock 356, mill 350, and the like over wired and/or wireless networks.

Workflow Detailed Example

Figure 4:
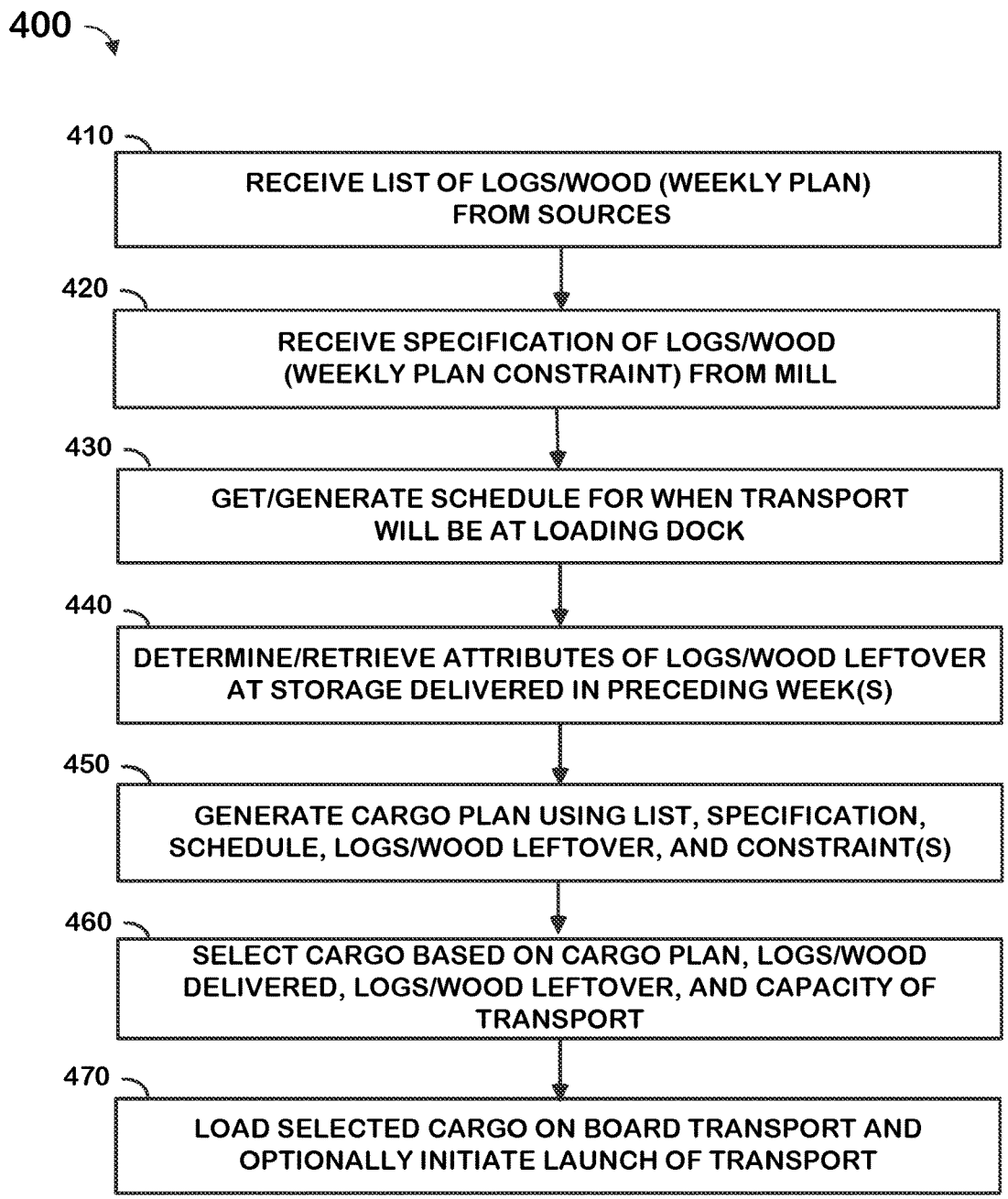
FIG. 4 illustrates additional details of the process of FIG. 2 in accordance with various embodiments.

FIG. 4 shows method (or process) 400, which depicts further details of method 200 in FIG. 2, in accordance with various embodiments. The details are provided purely for illustrative purposes and not limitation. Method 400 may have at least some of the characteristics of method 200 described above. Method 400 is described with reference to FIG. 3. In some embodiments, a computing system such as shown in FIGS. 5 and 6, which may be in control tower 322 and/or in the cloud, may perform process 400. In various embodiments, a client device may be in control tower 322 when the computing device is in the cloud.

Method 400 may begin at 410, where the computing system may receive a list of materials from sources 310_1-310_4. Table 1 illustrates a combined list of materials, referred to as a weekly plan. The weekly plan, here for week number 25, shows the planned volumes of logs coming from each of sources 310_1-310_4 and their characteristics, which may be referred to as constraints.

TABLE 1

| Week Number | Source Field | Source Block | Volume (meters$^3$) | Species | TPC (at field) | Calcium (average) |
| --- | --- | --- | --- | --- | --- | --- |
| 25 | El Callejon | 22568_63 | 6939.99 | Dunni | 180 | 1800 |
| 25 | El Callejon | 22568_65 | 5300.25 | Dunni | 170 | 1800 |
| 25 | Las Lilas | | 6827.32 | Grandis | 190 | 2500 |
| 25 | San Joaquin de Olaso | | 6802.23 | Globulus | 210 | 1900 |
| 25 | Los Olivos de Balarini | | 3637.17 | Dunni | 215 | 2500 |
| 25 | Bequelo | | 2076.80 | Dunni | 195 | 1950 |
| 25 | Capilla Vieja | | 252.54 | Globulus | 190 | 2800 |
| 25 | Las Lechuzas | | 7528.51 | Grandis | 200 | 2100 |

Source field may identify to a particular forest or section of forest that the logs are from. Source block may identify a particular part of the forest or section of forest. Volume may identify to a quantity of logs, such as a volume in cubic meters. Species may identify logs from a particular species of *Eucalyptus* trees. TPC may refer to total phenolic content of the logs, which may be measured at the source field. Calcium may identify a quantity of calcium measured/present in the logs. As shown, each row of Table 1 may refer to a shipment of a log type from one of sources 310_1-310-4. The characteristics of the logs from each of sources 310_1-310-4 may be manually and/or automatically measured by operators and machines at each of sources 310_1-310-4. The weekly plan may be provided to a computing system at depot 320 and/or the cloud by each of each of sources 310_1-310-4 using wired and/or wireless networks.

The weekly plan may additionally include a date and time that vehicles associated with each row of Table 1 (e.g., vehicles 314_1-314_4) will arrive at depot 320 during week 25. The arrival times may be updated using status information from vehicles 314_1-314_4 using wireless communications (e.g., Wi-Fi, 3G, 4G, 5G, and the like).

At 420, the computing system may receive a specification of the logs requested by mill 350. Table 2 illustrates a specification, referred to as a weekly plan constraint, here for weeks 25 and 26.

TABLE 2

| Week Number | Species1 (%) | Species2 (%) | Species3 (%) | Species4 (%) | Maximum Calcium Level | Tolerance (%) |
| --- | --- | --- | --- | --- | --- | --- |
| 25 | 80 | 15 | 5 | 0 | 2500 | 5.00 |
| 26 | 85 | 5 | 5 | 5 | 2500 | 3.00 |

Species1, species2, species3, and species4 refer to a species of *Eucalyptus* trees (e.g., Dunni, *Grandis*, *Globulus*, and the like) corresponding to the logs requested by mill 350. Although four species are shown in Table 2, a larger or smaller number of species may be in the weekly plan constraints (and in the weekly plan (Table 1)).

At 430, the computing system may generate a schedule for the arrival of transport 330 at loading dock 326 throughout week 25. The schedule may be based on schedules from prior weeks, average transit time by transport 330 between depot 320 and mill 350, current weather conditions, weather forecast, traffic conditions, and the like. Alternately or additionally, the computing system may receive the schedule from mill 350. Transport 330 may periodically provide progress information to the computing system at depot 320, mill 350, and/or a server in the cloud, which in turn may then update the arrival time of transport 330 at control tower 322.

At 440, the computing system may retrieve or determine an inventory of logs leftover from the preceding week(s) (leftovers). For example, if the current week is 25, the preceding week would be week 24. These are logs that were unloaded to storage 325 and not subsequently loaded onto transport 330 during the preceding week(s). The inventory may include at least some of the same information as in the rows of weekly plan (Table 1). The inventory may be recorded as logs are unloaded from vehicles 314_1-314_4 and include at least some of the information in the associated row(s) of the weekly plan. The inventory may be updated (e.g., logs removed from the inventory) as logs in storage 325 are loaded onto transport 330.

Cargo Plan

When sending logs from depot 320 to mill 350, the cargo plan should maximize the volume of logs delivered to the depot in week 25. In other words, as much of the logs delivered during week 25 as allowed by the specification (weekly plan constraint) should be loaded onto transport 330.

At 450, the computing system may generate a cargo plan based on the weekly plan, weekly plan constraints, schedule, and inventory of steps 410-440. The cargo plan may be used to select logs to load onto transport 330, such that the constraints in the weekly plan constraints are satisfied with the type i logs available on one of vehicles 314_1-314_4 (when present at depot 320) and in storage 325. This optimization may be represented mathematically in Equation 1:

$$B = \max \sum_{i=1}^{8} X_i \qquad \text{Equation 1}$$

where B is the maximum carrying volume of transport 330, $X_i$ is the volume of logs loaded onto transport 330 and the logs are type i (e.g., from a shipment reflected in a row of Table 1), and there are 8 rows (log types or shipments) in the weekly plan. Equation 1 may be subject to a constraint that the volume of type, species, and/or source i logs loaded onto transport 330 may not exceed the total volume of the type, species, and/or source i logs in the shipment (e.g., shipped to depot 320 from sources 310_1-310-4—which is a row of Table 1). This constraint may be represented mathematically by Equation 2:

$$\Delta_i \leq X_i \leq V_i, i=1, 2, \ldots, 8 \qquad \text{Equation 2}$$

where $\Delta_i = T_i - F_i$; $T_i$ is the total volume of type i logs in the cargo plan; $F_i$ is the total volume of type i logs in storage 325; and $V_1, V_2, V_3, \ldots, V_8$ correspond to entries in the "Volume (meters$^3$)" column in the weekly plan (Table 1). In the example of Table 1, there are eight rows (e.g., shipments or log types), i=8, and there is a volume $V_i$ corresponding to each one. Since $T_i$ is the total volume of type i logs to be transported to mill 350 during week 25, the amount of type i logs to be received from sources 310_1-310-4 in week 25 is $\Delta_i$.

Equation 1 may also be subject to the constraint that an average calcium level of a shipment (or log type) i (row of Table 1) does not exceed a maximum, C. In other words, C is the maximum average calcium for week 25. This constraint may be represented mathematically by Equation 3:

$$\frac{\left(\sum_{i=1}^{8} X_i C_i + \sum_{i=1}^{8} F_i K_i\right)}{\sum_{i}^{8} X_i + \sum_{i=1}^{8} F_i} \leq C \qquad \text{Equation 3}$$

where C=2500 in the "Maximum Calcium Level" in Table 2, $K_i$ is the average calcium level of logs of type i in storage 325—$K_i$ corresponds to $F_i$. Another characteristic of the type i logs, such as moisture, may be used.

Equation 1 may further be subject to the constraint that the total volume of logs loaded onto the transport 330 does not exceed B, the capacity of transport 330. This constraint may be represented mathematically by Equation 4:

$$\Sigma_i X_i + \Sigma_i F_i \leq B \qquad \text{Equation 4}$$

Additionally, Equation 1 may be subject to the constraint that the percentage of each type i (e.g., species of) log transported to mill 350 should follow the cargo plan. These constraints may be represented mathematically by Equations 5-8:

$$\frac{\sum_{i \in Dunni}(X_i + F_i)}{\sum_i X_i + \sum_i F_i} = \text{Dunni Percentage} \quad \text{Equation 5}$$

$$\frac{\sum_{i \in Grandis}(X_i + F_i)}{\sum_i X_i + \sum_i F_i} = \text{Grandis Percentage} \quad \text{Equation 6}$$

$$\frac{\sum_{i \in Globulus}(X_i + F_i)}{\sum_i X_i + \sum_i F_i} = \text{Globulus Percentage} \quad \text{Equation 7}$$

$$\frac{\sum_{i \in Specie4}(X_i + F_i)}{\sum_i X_i + \sum_i F_i} = \text{Species 4 Percentage} \quad \text{Equation 8}$$

Equation 5 constrains the percentage of species Dunni loaded onto transport 330 to the percentage of Dunni specified in the cargo plan; Equation 6 constrains the percentage of species Grandis loaded onto transport 330 to the percentage of Grandis specified in the cargo plan; Equation 7 constrains the percentage of species Grandis loaded onto transport 330 to the percentage of Grandis specified in the cargo plan; and Equation 8 constrains the percentage of species "species 4" loaded onto transport 330 to the percentage of "species 4" specified in the cargo plan.

Referring to week 25, percentages in the weekly plan constraint example of Table 2 may be substituted in Equations 6-7, resulting in Equations 9-11 (Equation 8 is 0):

$$\frac{X_1 + X_2 + X_5 + X_6 + F_1 + F_2 + F_5 + F_6}{\sum_i X_i + \sum_i F_i} = 80\% \quad \text{Equation 9}$$

$$\frac{X_3 + F_3 + X_8 + F_8}{\sum_i X_i + \sum_i F_i} = 15\% \quad \text{Equation 10}$$

$$\frac{X_4 + F_4 + X_7 + F_7}{\sum_i X_i + \sum_i F_i} = 5\% \quad \text{Equation 11}$$

In sum, the cargo plan is a solution to the objective function of Equation 1 that satisfies the above constraints.

For the purposes of numerical computation in some embodiments, a tolerance error range may be used. For example:

$$|\text{species fraction} - \text{percentage target}| \leq \epsilon \quad \text{Equation 12}$$

where the species fraction is the fraction of transport 330 capacity used by a species; percentage target is the percentage of transport 330 capacity allocated to the species by the cargo plan; and $\epsilon$ is the tolerance error range. For example, $\epsilon = 0.1\%$.

For the constraint represented by Equation 2, $\Delta_i = T_i - F_i$ may be a "gap" (difference) between the total volume of type i logs to loaded onto transport 330 and the volume of type i logs available in storage 325. At the beginning of week 25, for example, a stack of type i logs in storage 325 may have a high total phenolic content, a stack of type i logs in one of plots $325_{1,1} - 325_{X,Y}$ may be at or nearly at capacity of the stack (e.g., full), or a person responsible for depot 320 (e.g., a scheduler/planner, foreman, supervisor, manager, and the like) may determine that it is advantageous to load type i logs in the stack onto transport 330 and out of storage 325. Setting the full volume of type i logs in a stack in storage 325 to Ft and the current volume of type i logs in the stack to $S_j^i$, then a gap $\Delta_j^i = \tilde{F}_j^i - S_j^i$. The total gap would be $\Delta_i = \Sigma_j \Delta_i^j$.

$\Delta_i \leq V_i$ indicates that the gap to be filled for type i logs should be less than or equal to the volume that is planned/scheduled to arrive from sources 310_1-310-4 during week 25. Otherwise, the shipment(s) of type i logs from sources 310_1-310-4 may for the most part be unloaded to storage 325 and only later loaded onto transport 330.

When $\Delta_i > V_i$, $X_i$, which is generally the volume of type i logs loaded onto transport 330, may be spit into $\Delta_i$ and $X_i - \Delta_i$. A volume $\Delta_i$ of type i logs are unloaded to storage 325. When a barge is available, a volume $X_i - \Delta_i$ of type i logs are unloaded to transport 330 when transport 330 is at loading dock 326 and unloaded to storage 325 when transport 330 is not at loading dock 326.

Cargo Selection

At 460, the computing system or cloud computing system may select cargo. For example, the computing system may select cargo from type i logs delivered to depot 320 aboard one or more vehicles. For example, a volume $V_i$ of species i or from source i (e.g., of sources 310_1-310_4) is delivered to depot 320 by a vehicle (e.g., of vehicles 314_1-314_4) in week 25. Volume $X_i$ of species i (or type i) may be loaded onto transport 330 (when it is at loading dock 326) and volume $V_i - X_i$ may be loaded into storage 325.

When transport 330 is at loading dock 326, the computing system may check if there are any type i logs stacked in storage 325 to be loaded onto transport 330 according to the cargo plan. If there are, then the volume of those type i logs is $\tilde{T}_k$. $F_k$ may record the total volume of logs moved from storage 325 to transport 330. Initially when transport 330 is at loading dock 326, $F_k = \tilde{T}_k$. $W_i$ may record the accumulated volume of new (delivered in week 25) logs of species i (or type i) loaded onto transport 330. When a vehicle (of vehicles 314_1-314_4) carrying volume v of logs of species i is unloaded onto transport 330, then $W_i = W_i + v_j$. A volume $\omega_i$ of logs of species i loaded onto transport 330 may be checked if they were delivered in the current week (e.g., week 25). When volume $\omega_i$ of logs of species i was delivered in the current week, then $W_i = W_i + \omega_i$.

A capacity (volume) of transport 330 maybe denoted $C_k$. The volume of logs moved to transport 330 $F_k$ may be subtracted from the capacity $C_k$: $C_k - F_k$. Volume $A_k$ may record the accumulated volume of type i logs delivered by vehicles 314_1-314_4 in week 25 and loaded onto transport 330. Vehicles that will deliver volume $V_j$ logs to depot 320 for loading onto transport 330 in week 25 may be denoted by j, where j=1, 2, ..., J. The volume of logs arriving aboard the vehicles in the list should be less than or equal to the remaining capacity of transport 330, denoted by $R_k$:

$$\sum_{j=1}^{J} V_j \leq R_k \quad \text{Equation 13}$$

where $R_k = C_k - F_k - A_K$.

$$\sum_{j=1}^{J} V_j \leq C_k - F_k - A_k \quad \text{Equation 14}$$

$$\Sigma_j V_j^i \leq X_i - W_i \quad \text{Equation 15}$$

denotes that the target volume of logs delivered from a vehicle to transport 330 is not exceeded, where $V_j^i \in \{V_j:$ truck j is coming from source i$\}$.

When volume $V_k$ of logs delivered by a vehicle (e.g., of vehicles 314_1-314_4) in week 25 and loaded onto transport 33, then $A_k$ may be updated:

$$A_k = A_k + V_j \quad \text{Equation 16}$$

The remaining capacity of transport 33 may be:

$$R_k = R_k - V_j \quad \text{Equation 17}$$

The accumulated volume of wood delivered in week 25 and loaded onto transport 330:

$$W_i = W_i + V_j \quad \text{Equation 18}$$

When a new stack l of volume $S_l$ is loaded onto transport 330, then the accumulated volume of logs will be updated:

$$F_k = F_k + S_l - S_0^i \quad \text{Equation 19}$$

where $S_0^i$ is the original volume of leftover logs that included in $\tilde{T}_k$, so the remainder may be volume $S_l$ of the new stack of logs l. The remaining capacity of transport 330 for logs delivered in week 25 may be: $R_k = R_k - S_l$.

$$C_k = F_k + A_k + R_k \quad \text{Equation 20}$$

where $F_k$ is the volume of logs moved from storage 325 to transport 330, $A_k$ is the volume of logs moved from vehicles (e.g., vehicles 314_1-314_4) to transport 330, and $R_k$ is the The preceding steps are summarized in Table 3:

TABLE 3

Algorithm 1 Barge Delivery for Barge k procedure Barge Delivery for Barge k
2: $F_k \leftarrow \tilde{T}_k$
$V^i_j \leftarrow$ the wood volume of truck j carrying from source block i
4: $R_k \leftarrow \max\{0, C_k - A_k - F_k\}$
$G_i \leftarrow \max\{0, X_i - W_i\}$ for $i = 1, 2, \ldots, N$
6: $S^i_l \leftarrow$ The wood volume of the stack l from source bock i to be delivered to the barge.
$S^i_{l0} \leftarrow$ The portion of old wood left from last week in the stack St from source block i.
8: LP-solver: For the OT's on the way, choose the ques to be delivered to the barge, so that the total volumes delivered directly are maximized, while the weekly plan initiator constraints are also satisfied. (e.g. barge capacity not exceeded, total to- barge amount not exceeded.)
10: if $V^i_j$ indeed goes to the barge then
$A_k \leftarrow A_k + V^i_j, R_k \leftarrow R_k - V^i_j, W_i \leftarrow W_i + V^i_j, G_i \leftarrow G_i - V^i_j$.
12: else update corresponding stack it goes to.
14: if Stack $S^i_l$ is pulled to the barge then
$F_k \leftarrow F_k + S^i_l - S^i_{l0}, W_i \leftarrow W_i + S^i_l - S^i_{l0}$ Line 2 in Table 3 may be the accumulated volume of logs delivered to transport 330. $\tilde{T}_k$ may be an initial amount of logs delivered to depot 320 in an earlier week to be loaded onto transport 330. Line 4 may be the remaining capacity for logs. Line 5 indicates that for source i, $G_i$ may be the remaining volume of logs to be load onto transport 330. In line 15, $S_l^i - S_{l0}^i$ may refer to the portion of wood delivered in week 25 that consist of the stack 1 corresponding to source (or species or type) i.

At 470, the cargo selected at 460 may be loaded onto transport 330. At 470, the computing system may optionally initiate launch of transport 130.

Stack Selection

In some embodiments, logs in a stack in storage 325 are homogenous (e.g., are all of the same type, source, and/or species). There may be multiple stacks of the same type, source, and/or species. However, logs in a stack in storage 325 may additionally or alternatively be heterogenous (e.g., of different types, from different species, and/or from different sources) if they have similar characteristics. When logs from a truck (e.g., from one or more of vehicles 314_1-314_4) are unloaded to storage 325, they may be unloaded onto a stack of logs that is already there (e.g., logs leftover from a prior delivery). For example, to offload volume $V_j^i$ of type i logs from a vehicle (e.g., of vehicles 314_1-314_4) from source i (e.g., of sources 310_1-310-4) to storage 325, the computing system at control tower 322 or in the cloud may check whether there are any type i logs in storage 325 that were brought to depot 320 (delivered) in a preceding week (leftover logs).

When there are leftover logs of type i (of species i and/or from source i) in storage 325, the stacks of leftover logs may be designated as priority stacks and denoted as $P_1$, $P_2, \ldots, P_n$. The characteristics of $P_1, P_2, \ldots, P_n$ may be checked for conformity with the volume $V_j^i$ of type i logs from the vehicle. For example, the total phenolic content (TPC) of $P_1, P_2, \ldots, P_n$ from the stacks in storage 325 may be compared to the TPC of the volume $V_j^i$ of type i logs:

$$|\text{TPC(Stack)} - \text{Vehicle TPC}| \leq \text{acceptable threshold} \quad \text{Equation 21}$$

In other words, a criteria may be that the TPC difference between the logs in a stack and the logs in a vehicle is less than or equal to an acceptable threshold. A stack from among $P_1, P_2, \ldots, P_n$ having the highest volume may be selected when Equation 21 applies to (is true for) the highest volume stack. The volume $V_j^i$ of type i logs from the vehicle may be unloaded onto the selected stack(s).

When Equation 21 does not apply (is not true) for any of $P_1, P_2, \ldots, P_n$, then the highest volume stack in storage 325—that is not from $P_1, P_2, \ldots, P_n$—may be selected when Equation 21 applies to the highest volume stack. In other words, when there are not leftover logs of type i (of species i and/or from source i) in storage 325 where the TPC difference between the logs in a stack and the logs in a vehicle is less than or equal to an acceptable threshold, a stack of leftover logs of another type (of another species and/or from another source) (e.g., other than of type i, of species i, and/or from source i) meeting the TPC criteria and having the highest volume may be selected. The volume $V_j^i$ of type i logs from the vehicle may be unloaded onto the selected stack(s).

Computer System

Figure 5:
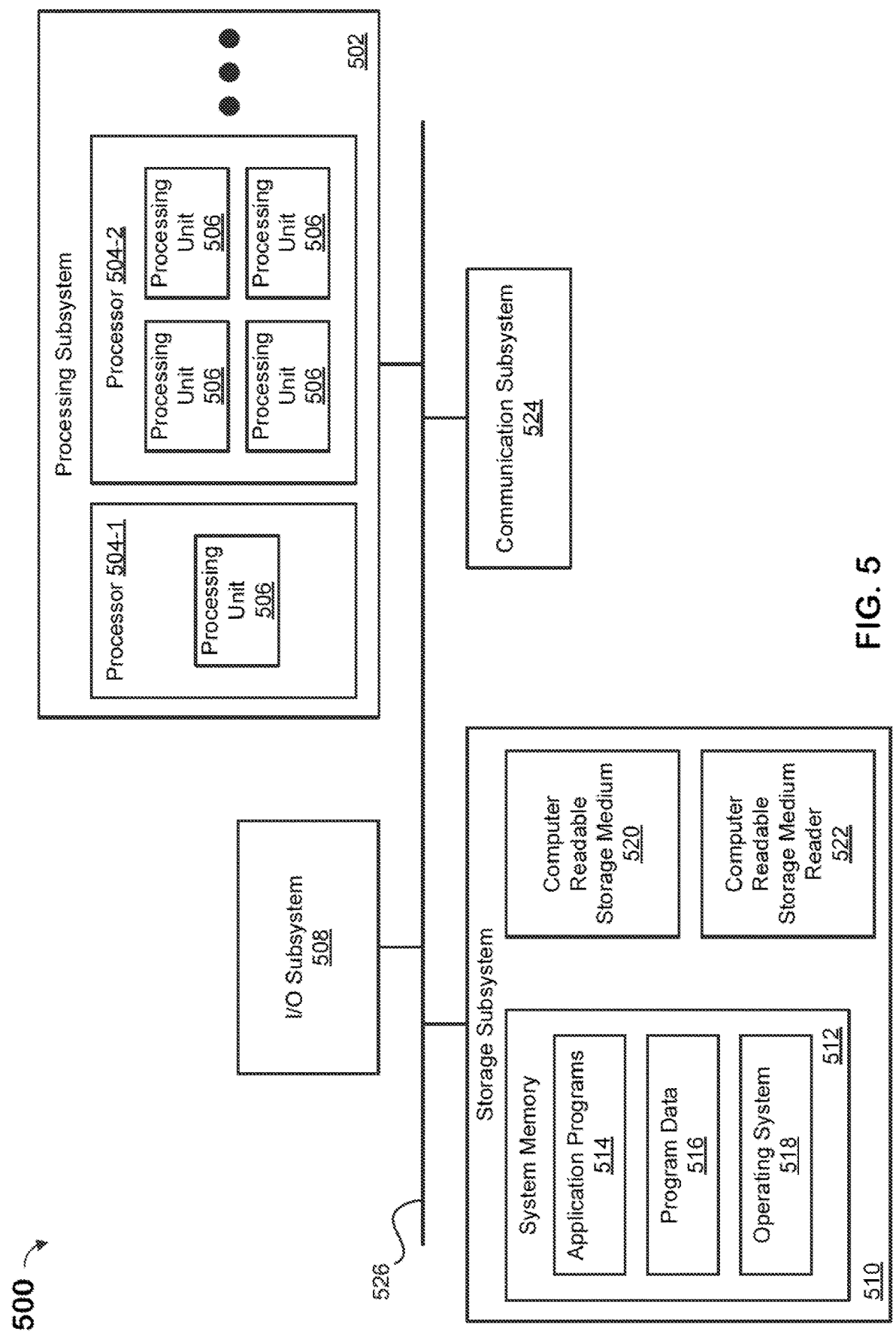
FIG. 5 illustrates an exemplary computer system, in which various embodiments may be implemented.

FIG. 5 illustrates an exemplary computer system 500 for implementing various embodiments described above. For example, computer system 500 may be used to implement the computing system describe above in FIGS. 1-4. Computer system 500 may be a desktop computer, a laptop, a server computer, or any other type of computer system or combination thereof. In addition, computer system 500 can implement many of the operations, methods, and/or processes described above (e.g., methods 200 and 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to processes 200 and 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 105, upgraded application 110, etc.), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple IOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Storage subsystem 510 may also store data used for, or generated during, the execution of the software.

Storage subsystem 510 may also include computer-readable storage medium reader 722 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
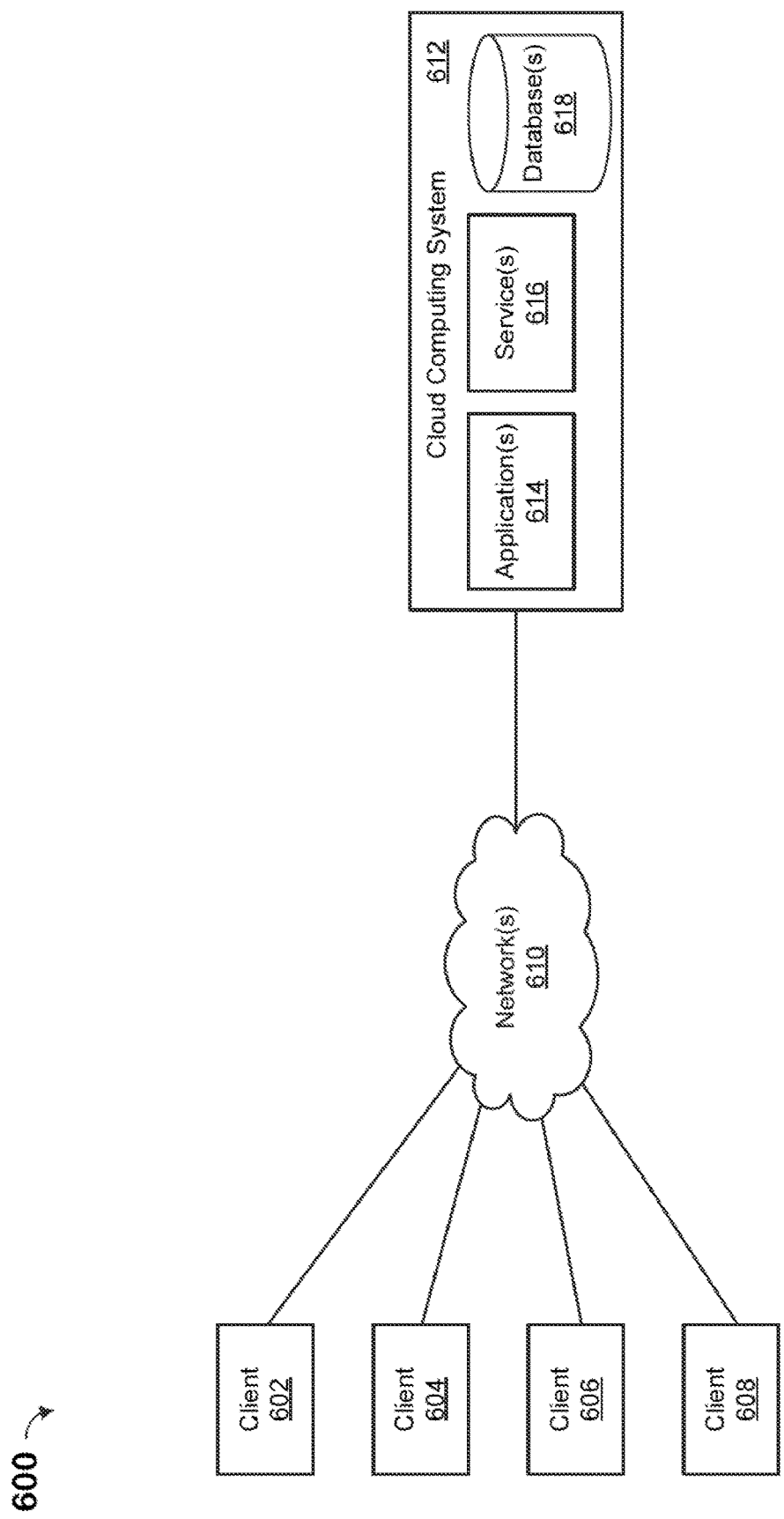
FIG. 6 illustrates an exemplary system, in which various embodiments may be implemented.

FIG. 6 illustrates an exemplary cloud computing system 600 for implementing various embodiments described above. For example, cloud computing system 612 may be used to implement the computing system described in FIGS. 1-4. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 612 is referred to as a "cloud service." Typically, servers and systems that make up cloud computing system 612 are different from the on-premises servers and systems of a customer. For example, cloud computing system 612 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 616 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 500, as described above by reference to FIG. 5. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory computer-readable storage medium having embodied thereon a program, the program being executable by a processor to perform a method, the method comprising:
   receiving a list of materials to be received by a depot from a plurality of sources within a predetermined period of time;
   receiving a specification of materials to be received by a facility from the depot within the predetermined period of time;
   generating a cargo plan based on the list and the specification, the cargo plan indicating quantities of each material of a plurality of materials to be loaded onto a transport within the predetermined period of time, wherein the generating comprises:
      optimizing a first quantity for the each material of a plurality of materials to be loaded onto the transport based on the list of materials and specification of materials subject to constraints, the constraints including at least one of a second quantity for the each material to be delivered to the depot, a third quantity for the each material present in a second storage area of the depot, a level of a characteristic for the each material, a capacity of the transport, and a percentage of the each material included in the specification;
   moving a first material of the plurality of materials from a vehicle to the transport based on the cargo plan during the predetermined period of time when the vehicle and the transport are present at the depot, the vehicle carrying the material to the depot;
   moving a second material of the plurality of materials from the vehicle to a first storage area based on the cargo plan during the predetermined period of time when the transport is not present at the depot;
   moving a third material of the plurality of materials from the second storage area of the depot to the transport based on the cargo plan during the predetermined period of time when the third material and the transport are present at the depot, the second storage area holding the third material; and
   initiating launch of the transport.

2. The non-transitory machine-readable medium of claim 1, wherein the cargo plan further indicates quantities of each material of the plurality of materials to be moved to at least one storage area of the depot within the predetermined period of time based on the first quantity for the each material to be loaded onto the transport and the second quantity for the each material to be delivered to the depot.

3. The non-transitory machine-readable medium of claim 1, wherein the cargo plan further indicates quantities of each material of the plurality of materials to be loaded onto the transport from at least one storage area of the depot within the predetermined period of time based on the first quantity for the each material to be loaded onto the transport and a fourth quantity for the each material leftover from a time prior to the predetermined period of time.

4. The non-transitory machine-readable medium of claim 1, wherein the method further comprises:
   receiving a schedule for the transport, the schedule indicating when the transport will be present at the depot during the predetermined period of time, the schedule being based on an average transit time between the depot and the facility, and a weather forecast, and
   wherein generating the cargo plan is further based on the schedule.

5. The non-transitory machine-readable medium of claim 1, wherein the list includes first characteristics of each material of the materials to be received by the depot.

6. The non-transitory machine-readable medium of claim 5, wherein the first characteristics include at least one of: a source identifier, a volume, a species, a total phenolic content, and a calcium amount of each material of the materials to be received by the depot.

7. The non-transitory machine-readable medium of claim 1, wherein the specification includes second characteristics of each material of the materials to be received by the facility during the predetermined amount of time.

8. A method comprising:
   receiving a list of materials to be received by a depot from a plurality of sources within a predetermined period of time;
   receiving a specification of materials to be received by a facility from the depot within the predetermined period of time;
   generating a cargo plan based on the list and the specification, the cargo plan indicating quantities of each material of a plurality of materials to be loaded onto a transport within the predetermined period of time, wherein the generating comprises:
      optimizing a first quantity for the each material of a plurality of materials to be loaded onto the transport based on the list of materials and specification of materials subject to constraints, the constraints including at least one of a second quantity for the each material to be delivered to the depot, a third quantity for the each material present in a second storage area of the depot, a level of a characteristic for the each material, a capacity of the transport, and a percentage of the each material included in the specification;
   moving a first material of the plurality of materials from a vehicle to the transport based on the cargo plan during the predetermined period of time when the vehicle and the transport are present at the depot, the vehicle carrying the material to the depot;
   moving a second material of the plurality of materials from the vehicle to a first storage area based on the cargo plan during the predetermined period of time when the transport is not present at the depot;

moving a third material of the plurality of materials from a second storage area of the depot to the transport based on the cargo plan during the predetermined period of time when the third material and the transport are present at the depot, the storage area holding the third material; and initiating launch of the transport.

9. The method of claim 8, wherein the cargo plan further indicates quantities of each material of the plurality of materials to be moved to at least one storage area of the depot within the predetermined period of time based on the first quantity for the each material to be loaded onto the transport and the second quantity for the each material to be delivered to the depot.

10. The method of claim 8, wherein the cargo plan further indicates quantities of each material of the plurality of materials to be loaded onto the transport from at least one storage area of the depot within the predetermined period of time based on the first quantity for the each material to be loaded onto the transport and a fourth quantity for the each material leftover from a time prior to the predetermined period of time.

11. The method of claim 8, further comprising:
receiving a schedule for the transport, the schedule indicating when the transport will be present at the depot during the predetermined period of time, the schedule being based on an average transit time between the depot and the facility, and a weather forecast, and
wherein generating the cargo plan is further based on the schedule.

12. The method of claim 8, wherein the list includes first characteristics of each material of the materials to be received by the depot.

13. The method of claim 12, wherein the first characteristics include at least one of: a source identifier, a volume, a species, a total phenolic content, and a calcium amount of each material of the materials to be received by the depot.

14. The method of claim 8, wherein the specification includes second characteristics of each material of the materials to be received by the facility during the predetermined amount of time.

15. A system comprising:
a set of processing units; and
a non-transitory machine-readable medium storing instructions that when executed by at least one processing unit in the set of processing units cause the at least one processing unit to perform a method comprising:
receiving a list of materials to be received by a depot from a plurality of sources within a predetermined period of time;
receiving a specification of materials to be received by a facility from the depot within the predetermined period of time;
generating a cargo plan based on the list and the specification, the cargo plan indicating quantities of each material of a plurality of materials to be loaded onto a transport within the predetermined period of time, wherein the generating comprises:

optimizing a first quantity for the each material of a plurality of materials to be loaded onto the transport based on the list of materials and specification of materials subject to constraints, the constraints including at least one of a second quantity for the each material to be delivered to the depot, a third quantity for the each material present in a second storage area of the depot, a level of a characteristic for the each material, a capacity of the transport, and a percentage of the each material included in the specification;

moving a first material of the plurality of materials from a vehicle to the transport based on the cargo plan during the predetermined period of time when the vehicle and the transport are present at the depot, the vehicle carrying the material to the depot;

moving a second material of the plurality of materials from the vehicle to a first storage area based on the cargo plan during the predetermined period of time when the transport is not present at the depot;

moving a third material of the plurality of materials from a second storage area of the depot to the transport based on the cargo plan during the predetermined period of time when the third material and the transport are present at the depot, the storage area holding the third material; and initiating launch of the transport.

16. The system of claim 15, wherein the cargo plan further indicates quantities of each material of the plurality of materials to be moved to at least one storage area of the depot within the predetermined period of time based on the first quantity for the each material to be loaded onto the transport and the second quantity for the each material to be delivered to the depot.

17. The system of claim 15, wherein the cargo plan further indicates quantities of each material of the plurality of materials to be loaded onto the transport from at least one storage area of the depot within the predetermined period of time based on the first quantity for the each material to be loaded onto the transport and a fourth quantity for the each material leftover from a time prior to the predetermined period of time.

18. The system of claim 15, wherein the method further comprises:
receiving a schedule for the transport, the schedule indicating when the transport will be present at the depot during the predetermined period of time, the schedule being based on an average transit time between the depot and the facility, and a weather forecast, and
wherein generating the cargo plan is further based on the schedule.

19. The system of claim 15, wherein the list includes first characteristics of each material of the materials to be received by the depot.

20. The system of claim 19, wherein the first characteristics include at least one of: a source identifier, a volume, a species, a total phenolic content, and a calcium amount of each material of the materials to be received by the depot.

* * * * *